(12) United States Patent
Oancea et al.

(10) Patent No.: US 10,671,777 B2
(45) Date of Patent: Jun. 2, 2020

(54) SCALABLE FINITE ELEMENT SIMULATION OF ADDITIVE MANUFACTURING

(71) Applicant: Dassault Systemes Simulia Corp., Johnston, RI (US)

(72) Inventors: Victor George Oancea, East Greenwich, RI (US); Juan Antonio Hurtado Ortiz, Providence, RI (US); Bruce Engelmann, East Greenwich, RI (US); William John Grimes, Cohasset, MA (US)

(73) Assignee: DASSAULT SYSTEMES SIMULIA CORP., Johnston, RI (US)

( * ) Notice: Subject to any disclaimer, the term of this patent is extended or adjusted under 35 U.S.C. 154(b) by 547 days.

(21) Appl. No.: 15/597,473

(22) Filed: May 17, 2017

(65) Prior Publication Data

US 2017/0337307 A1   Nov. 23, 2017

Related U.S. Application Data

(60) Provisional application No. 62/339,203, filed on May 20, 2016.

(51) Int. Cl.
*G06F 30/23* (2020.01)
*B33Y 50/00* (2015.01)
*G06F 111/10* (2020.01)

(52) U.S. Cl.
CPC .............. *G06F 30/23* (2020.01); *B33Y 50/00* (2014.12); *G06F 2111/10* (2020.01)

(58) Field of Classification Search
CPC .. G06F 17/5018; G06F 2217/16; B33Y 50/00
See application file for complete search history.

(56) References Cited

U.S. PATENT DOCUMENTS

2015/0352794 A1\* 12/2015 Nguyen ................. G06F 30/23
                                                                  700/98
2016/0086376 A1   3/2016 Tang et al.
2016/0321384 A1   11/2016 Pal et al.

OTHER PUBLICATIONS

Zohdi "Modeling and simulation of cooling-induced residual stresses in heated particulate mixture depositions in additive manufacturing." Comput Mech (2015) 56:613-630. Accepted: Jul. 27, 2015 / Published online: Aug. 23, 2015.\*

(Continued)

*Primary Examiner* — Saif A Alhija
(74) *Attorney, Agent, or Firm* — Armstrong Teasdale LLP

(57) ABSTRACT

Methods and systems for providing accurate, scalable, and predictive 3D printing simulations using numerical methods for part-level simulations. Complex parts can be discretized into finite elements using independent and arbitrary meshing. The real additive manufacturing tooling path and printing time of a printing machine are simulated and applied to the mesh of finite elements using an intersection module that combines the finite element mesh with the tool path information of the printing machine in a geometric sense. This allows for localized heating effects to be simulated very accurately, and for cooling assessments to be precisely computed given the intersection module's computation of partial facets and volumes of the finite elements at any given time in the printing simulation.

17 Claims, 8 Drawing Sheets

(56) References Cited

OTHER PUBLICATIONS

Hodge, et al., "Implementation of a thermomechanical model for the simulation of selective laser melting", Comput Mech (2014) 54:33-51.

Ferguson, et al., "Using Simulation for Heat Treat Process Design: Matching the Quenching Process with Steel Grade and Product Geometry", ICTPMCS-2010, May 31-Jun. 2, 2010, Shanghai, China, 7 pages.

Leblond, "Mathematical Modelling of Transmformation Plasticity in Steels II: Coupling with Strain Hardening Phenomena", International Journal of Plasticity, vol. 5, pp. 573-591, 1989.

Michaleris, "Modeling metal deposition in heat transfer analyses of additive manufacturing processes", Finite Elements in Analysis and Design 86 (2014) 51-60.

Tan, et al., "An experimental and simulation study on building thickness dependent microstructure for electron beam melted Ti-6Al-4V", *Journal of Alloys and Compounds* (2015), doi:10.1016/j.jallcom.2015.05.178, 18 pages.

3DSIM, "The Additive Manufacturing Problem we Solve", obtained May 6, 2016, 2 pages, http://3dsim.com/technology/.

Project Pan, "Novel simulation technologies", 2016, pp. 1-5, http://pancomputing.com/technology/.

Dante Solutions, obtained Mar. 20, 2016, 2 pages, http://www.dante-solutions.com/home.

Truchas "A Simulation Tool for Manufacturing", Advanced Simulation and Computing (ASC) Telluride Project Team, Nuclear Weapons Highlights 2007, 2 pages, http://www.lanl.gov/orgs/adtsc/publications/nw_highlights_2007/ch6/6_2telluride.pdf.

Talagani, et al., "Numerical Simulatin of Big Area Additive Manufacturing (3D Printing) of a Full Size Car", AMPE Journal, vol. 51, No. 4, Jul./Aug. 2015, pp. 27-26.

European Search Report issued in European Application No. EP 17168873.2, entitled "Scalable Finite Element Simulation of Additive Manufacturing," dated Sep. 20, 2017.

EP Office Action for related application 17168873.2 dated Aug. 13, 2018; 5 pp.

Examination Report of European Application No. 17 168 873.2; dated Apr. 2, 2019, 5 pages.

* cited by examiner

SCALABLE FINITE ELEMENT SIMULATION OF ADDITIVE MANUFACTURING

RELATED APPLICATION

This application claims the benefit of U.S. Provisional Application No. 62/339,203, filed on May 20, 2016. The entire teachings of the above application are incorporated herein by reference.

BACKGROUND

The impetus of 3D printing technology in recent years is significant. Many printer manufacturers exist and new companies seem to appear overnight. Despite this wave of new developments, in many (if not most) cases, the reliability of the technology is limited, and printed, or additive manufactured ("AM"), parts suffer from defects that lead to subpar strength and fatigue life when compared to parts manufactured with conventional technologies. This negative aspect limits severely the spread of the technology. Computer simulations are sought to provide insight into the process so that progress in raising the quality of AM parts can be achieved.

Many physics-related aspects of the additive manufacturing process are similar to some of the conventional manufacturing technologies, such as casting and welding. Material is added in a hot and fluid state and then it cools down. In additive manufacturing, the material is added incrementally in a molten state or is brought to a molten state by a moving heat source (e.g., laser) after which cooling occurs on a continuously evolving surface. The additional challenges with AM, particularly with metal fabrication, have to do with the vast disparity in time and length scales that one has to deal with during manufacturing: very localized and rapidly evolving physics in the "action" zone while the manufacturing process for the whole part takes hours or perhaps days.

The efforts to develop numerical techniques to simulate certain aspects of an additive manufacturing process are numerous and span several communities of scientists and engineers from academics to applied research commercial entities. The difficulties to capture/predict via computer simulations such processes are many, including: (1) vastly different time scales of the melting/solidification physics (milliseconds) and the overall manufacturing time of a typical part (hours of printing on the machine); (2) wide range of scale lengths, from microns associated with melt pools to hundreds of millimeters necessary to model a typical part; (3) rapidly evolving high temperature gradients around the "action" zone, which leads to highly anisotropic material final properties (before eventual heat treatment); (4) assuming that adequate models are employed, very large simulation times are typically necessary to model such processes in order to capture all of the above.

Developing novel numerical schemes would be necessary to cope with all these challenges. The following are examples of existing technologies, each of which do not solve the difficulties described above:

3DSIM is a company that claims it develops efficient numerical simulation technology based on finite elements. 3DSIM's method appears to take advantage of adaptive mesh refinement/coarsening techniques while leveraging advanced metal modeling constitutive behavior. See www.3dsim.com and I. Gibson, D. Rosen, B. Stucker, Additive manufacturing technologies: rapid prototyping to direct digital manufacturing, Springer, N.Y., 2009. The technology is intended for laser melting/sintering AM applications and employs an automated mesh refinement technique in the "action" zone (e.g., current laser location). However, it does not leverage actual laser path information and recoater/spreader bar throughout the part. Consequently, the overall cooling by convection and radiation for the whole part loses accuracy/predictiveness as a result. Moreover, the automated refinement/coarsening of the mesh has negative implications on the overall computational performance when analyses are run in parallel on multiple CPUs (especially on a large number of CPUs).

PANCOMPUTING is another example of a company that leverages finite element-based solutions. PANCOMPUTING's method also incorporates adaptive mesh refinement techniques and is able to make predictions of undesired distortions during the printing process. See www.pancomputing.com and P. Michaleris, "Modeling metal deposition in heat transfer analyses of additive manufacturing processes In situ monitoring." Finite Elements in Analysis and Design (2014): 51-60. The technology is similar to 3DSIM and faces similar limitations.

The United State National Labs have also been investing on the topic with Los Alamos and Lawrence Livermore leading the effort. At Los Alamos, long time existing casting simulation software is currently being adapted/re-purposed to study numerically AM processes (see Truchas casting software available at www.lanl.gov). At Lawrence Livermore, comprehensive simulation technology is being developed to address at a micro-scale the complex physics of phase transitions from powder, to liquid, to solid and attempting to predict residual stresses for very small parts. See N. E. Hodge, R. M. Ferencz, J. M. Solberg, "Implementation of a thermomechanical model for the simulation of selective laser melting" Comput Mech (2014) 54:33-51). The US National labs do not seem to focus on accurate predictions for part-level simulations. Instead, they seem to be spending much effort in understanding the basic behavior on very small-scale models without paying enough attention on overall behavior as far as realistic parts are concerned.

Academics researching the topic are too numerous to list here in a comprehensive fashion. Many leverage old existing models developed originally for welding or casting, such as described in J. B. Leblond, "Mathematical Modeling of Transformation Plasticity in Steels," International Journal of plasticity, Vol 5, 573-591, 1989. More recent works (such as in Xipeng Tan, Yihong Kok, etc. "An experimental and simulation study on build thickness dependent microstructure for electron beam melted Tie6Ale4V, Journal of Alloys and Compounds 646 (2015) 303-309) focus on more or less sophisticated material constitutive behavior models that are quite valuable and practical. Academics of all sorts, similar to the National Labs, also do not have a focus on part-level simulations for scalable predictive solutions. When part-level presentations are included, the geometry associated with the shape is severely simplified to accommodate for the lack of technology in dealing with realistic parts.

Numerical modeling of heat treatment related applications has a significant relevance in modeling, in the case of metals, of metallurgical transformation throughout the part being modeled. See www.dante-solutions.com and B. Lynn Ferguson and Zhichao Li, "Using Simulation for Heat Treat Process Design: Matching the Quenching Process", ICTP-MCS-2010, 31 May-2 Jun. 2010, Shanghai, China. Heat treatment software packages, while very relevant for AM process simulation from a variety of perspectives, suffer from a severe limitation: they lack the ability of simulating local thermal aspects (such as laser heating) and managing evolving surfaces of an additive manufacturing process Thus, despite the numerous prior efforts for developing the various numerical modeling technologies, there is still a number of rather significant limitations associated with these developments.

SUMMARY OF THE INVENTION

Embodiments of the present invention provide accurate, scalable, and predictive 3D printing simulations using numerical methods for part-level simulations. One example embodiment of the present invention is a method of simulating additive manufacturing of a real-world object. According to the method, a processor discretizes a representation of the real-world object into a plurality of finite elements using arbitrary meshes of arbitrary densities, where the finite elements are representations of geometrical portions of the real-world object, and the finite elements are stored in memory. A real-world additive manufacturing sequence to be used by a real-world additive manufacturing device to manufacture the real-world object is determined as a function of time, where the additive manufacturing sequence includes a plurality of time steps and indicates an order in which to manufacture the portions of the real-world object represented by the finite elements. For each time step of the additive manufacturing sequence, the processor (i) simulates manufacturing an arbitrary geometric layer of a finite element of the finite elements according to the additive manufacturing sequence, (ii) determines a sequence of simulated heat fluxes at corresponding locations of the layer according to the additive manufacturing sequence, where the simulated heat fluxes account for a path and intensity of a heat source of a simulated additive manufacturing device within the layer when simulating the manufacturing of the layer, (iii) stores in the memory representations of the simulated heat fluxes in association with the finite element corresponding to the layer, and (iv) for each finite element having a simulated manufactured layer, determines a current exposed partial surface area of the finite element, simulates cooling of the finite element based on the current exposed partial surface area of the finite element, and updates in the memory the representations of the simulated heat fluxes associated with the finite element based on the simulated cooling of the finite element.

Another example embodiment of the present invention is also a method of simulating additive manufacturing of a real-world object, which involves a processor in communication with a memory storing, as representations, a plurality of finite elements of the real-world object. The method obtains a real-world additive manufacturing sequence to be used by a real-world additive manufacturing device to manufacture the real-world object, where the additive manufacturing sequence includes a plurality of time steps. For each time step of the additive manufacturing sequence, the processor (i) simulates manufacturing an arbitrary geometric layer of a finite element of the plurality of finite elements according to the additive manufacturing sequence, (ii) determines one or more simulated heat fluxes at corresponding locations of the layer according to the additive manufacturing sequence, where the simulated heat fluxes account for a path and intensity of a heat source of a simulated additive manufacturing device within the layer when simulating the manufacturing of the layer, (iii) stores in the memory representations of the simulated heat fluxes in association with the finite element corresponding to the layer, and (iv) for each finite element having a simulated manufactured layer, determines a current exposed partial surface area of the finite element, simulates cooling of the finite element based on the current exposed partial surface area of the finite element, and updates in the memory the representations of the heat fluxes of the finite element based on the simulated cooling of the finite element.

In some embodiments of the above methods, determining the current exposed partial surface area of the finite element can include determining the surface facets of the finite element that are not located adjacent to another active finite element surface facet based on the finite elements stored in the memory.

In some embodiments of the above methods, determining the sequence of simulated heat fluxes at corresponding locations of the layer can include analyzing a path of simulated additive manufacturing tooling with respect to the layer according to the additive manufacturing sequence, and determining the sequence of simulated heat fluxes can include, for a given simulated heat flux, determining an intensity and duration of the heat source at a portion of the corresponding layer.

In some embodiments of the above methods, updating the representations of the simulated heat fluxes associated with the finite element can include determining and storing, in the memory, a partial volume of the finite element and partial facets areas of the finite element. In such embodiments, updating the representations of the heat fluxes of the finite element can include determining a state of a simulated substrate used to manufacture the finite element based on the simulated cooling of the finite element, the determined partial volume of the finite element, and the partial facets areas of the finite element, or can further include, for each finite element, storing in the memory a list of any neighboring finite elements and the partial volumes and partial facets areas of those neighboring finite elements.

Another example embodiment of the present invention is a system for simulating additive manufacturing of a real-world object, which includes a data store, hardware processor, and intersection module. The data store stores a plurality of finite elements of the real-world object, where the finite elements are representations of geometrical portions of the real-world object according to arbitrary meshes of arbitrary densities. The hardware processor is in communication with the data store and is configured to simulate a real-world additive manufacturing device manufacturing the real-world object according to an additive manufacturing sequence that includes a plurality of time steps. The intersection module is in communication with the hardware processor and the data store and is configured to, given a particular time step of the additive manufacturing sequence, (i) determine added volumes and partial facet areas for finite elements affected by the simulated additive manufacturing device at the particular time step of the additive manufacturing sequence, and (ii) determine heat flux events and locations for the finite elements at the particular time step of the additive manufacturing sequence. The hardware processor is configured to, in simulating the real-world additive manufacturing device, for each time step of the additive manufacturing sequence, (i) provide the time step to the intersection module, (ii) receive, from the intersection module, added volumes and partial facet areas for finite elements affected by the simulated additive manufacturing device at the particular time step of the additive manufacturing sequence, (iii) for each finite element of the affected finite elements, update the finite element stored in the data store with the added volumes and partial facet areas for the finite element, and determine a current exposed partial surface area of the finite element based on the added volumes and partial facet areas for the finite element, (iv) receive, from the intersection module, heat flux events and associated locations for the finite elements, (v) for each received heat flux event, update nodal heat fluxes associated with a corresponding finite element stored in the data store based on the associated location, (vi) determine cooling of each finite element based on the current exposed partial surface area of the finite element, and (vii) update each nodal heat flux based on the determined cooling of the finite element corresponding to the nodal heat flux.

In some embodiments, the data store can include, for each finite element stored in the data store, a list of neighboring finite elements, and the processor may be configured to determine the current exposed partial surface area of a given finite element based on the list of neighboring finite elements for the given finite element. In such embodiments, the data store can further include, for each neighboring finite element in each list of neighboring finite elements, an indication whether the neighboring finite element is active, and the processor may be configured to determine the current exposed partial surface area of a given finite element based on the list of neighboring finite elements for the given finite element and the associated indications of whether each neighboring finite element is active.

In some embodiments, the hardware processor may be further configured to provide the intersection module with nodal coordinates of the simulated additive manufacturing device, or may be further configured to determine and store, in the data store, states of simulated substrates used to manufacture the finite elements based on the simulated cooling of the finite elements and the heat flux events.

In some embodiments, the intersection module may be configured to determine heat flux events based on an intensity and path of a simulated heat source of the simulated additive manufacturing device at a given time step of the additive manufacturing sequence.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Embodiments of the present invention provide accurate, scalable, and predictive 3D printing simulations using numerical methods for part-level simulations, and involve the following methodologies.

Figure 1:
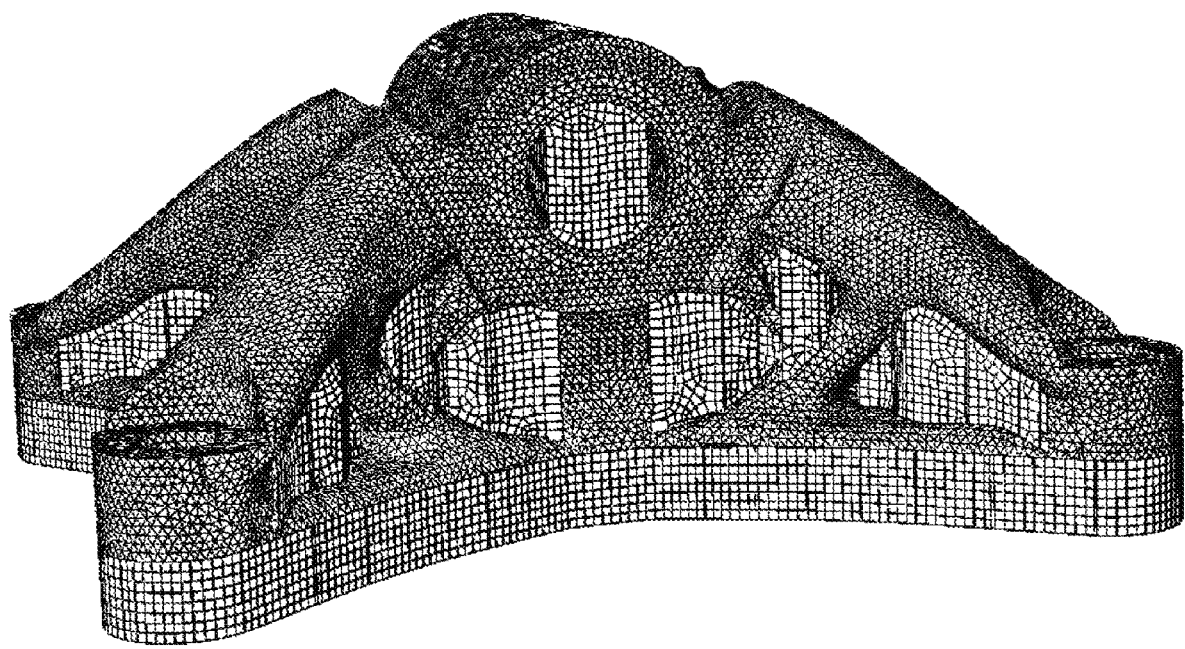
FIG. 1 is a schematic diagram illustrating arbitrary meshing of a complex shape to be manufactured using an additive manufacturing process.

Meshing: The geometric shape of the part for which the 3D printing process is to be modeled is first discretized with finite elements. Arbitrary meshes can be used of arbitrary mesh densities. Using such meshes greatly improves on streamlining the analysis process as typically AM fabricated parts have VERY complex shapes for which uniform meshes are not really possible. An example of such a complex shape with arbitrary meshing is shown in FIG. 1

Machine information: Information related to a 3D printing machine (e.g., powder recoating sequence, laser scan path, material deposition of the printing head, etc.) that will be manufacturing the part is pre-processed with no loss of accuracy from actual data as used by the physical machine. As far as the modeling process is concerned, no loss of accuracy is thus encountered by simplifying the information that the printing machine would actually use.

Figure 2:
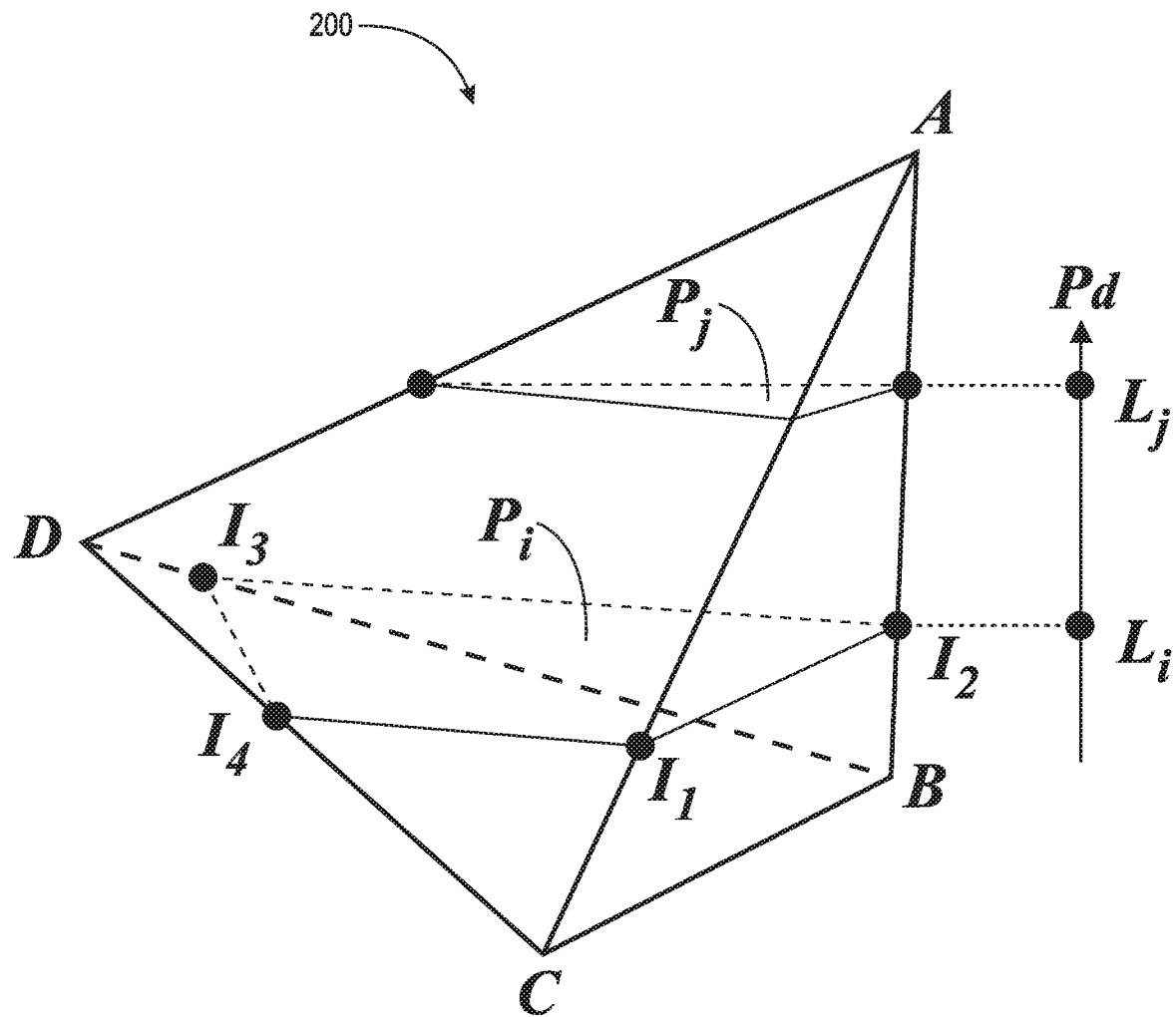
FIG. 2 is a schematic diagram illustrating an example finite element showing two example planes along two layers of the finite element, according to an example embodiment of the present invention.

Intersections: A component referred to as an "Intersection Module" is used to "intersect" the finite element mesh with the tool path information of the printing machine in a geometric sense. For example, the information of the current surface height of a powder bed recoater may be used to compute a partial element volume of the elements intersected at any given time. FIG. 2 depicts a finite element 200 and shows two different partial volumes at two different times during the simulation. Pd shows the additive manufacturing direction. Plane Pi is the fill level of the finite element 200 at layer $L_i$. Plane $P_j$ is the fill level of the finite element 200 at layer $L_j$, which is at a time later then $L_i$. In addition, partial areas on the facets of the intersected elements are computed. For example, the partial area of polygon A,B,C is $I_1,I_2,B,C$ when the finite element is filled up to layer $L_i$. The intersection can be based on either the original shape of the part or the current shape of the predicted deformed/distorted shape of the part during the analysis. In many embodiments, the Intersection Module may be implemented using software.

Progressive element activation: Based on the partial element volume described above, at any given point during the simulation, any particular finite element is either completely filled with mater, partially filled with matter, or completely empty. The Intersection Module keeps track of this evolution in a precise fashion. Partial volume integration techniques are employed to account for the various material phases or states (e.g., powder, molten liquid state, solid state) in each of these partial volumes. An arbitrary time incrementation sequence is allowed. For example, in FIG. 2, a thin slice around the $I_1,I_2,I_3,I_4$ polygon ($P_i$) of finite element 200 would be material in raw state (e.g., powder or liquid), below would be solid (or partially liquid), and above would be void. The progressive activation technology allows for exact specification of the initial temperature at which the material in raw state (e.g., powder) may be added to a given element. This is achieved by applying an automatically computed equivalent latent heat flux based on the difference between the current temperature of the element's integration point and the desired initial temperature.

Figure 3:
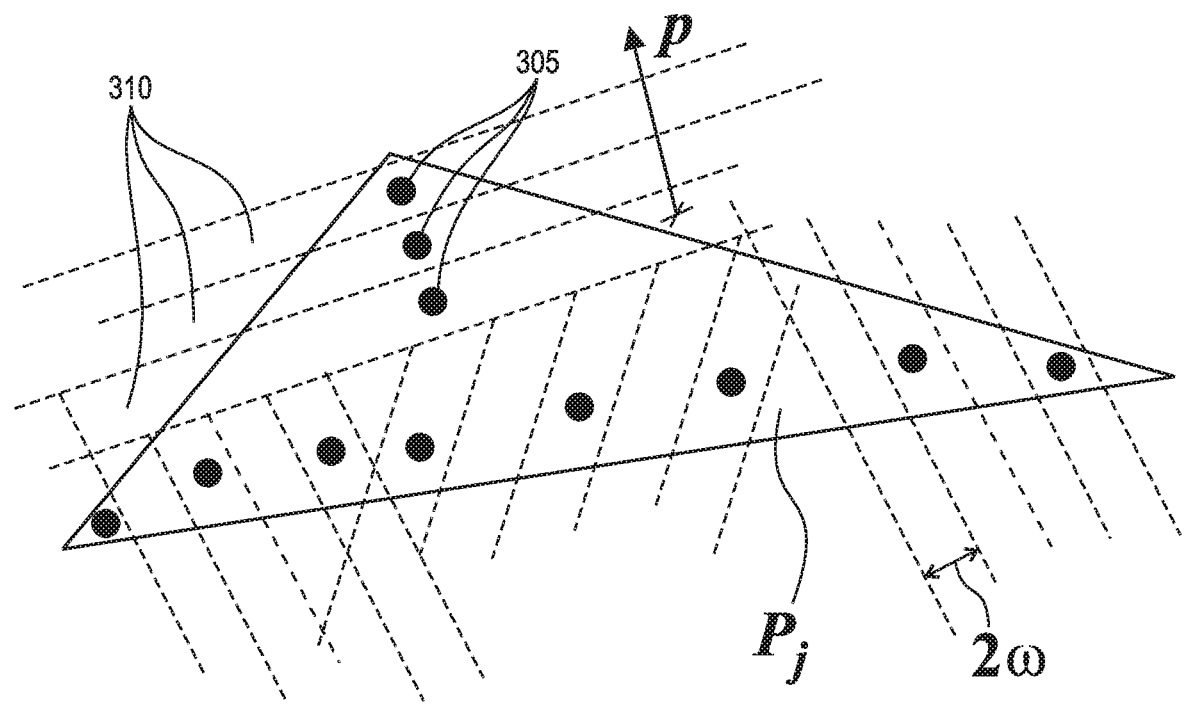
FIG. 3 is a schematic diagram illustrating example additive manufacturing tool paths used to manufacture an example layer of a finite element, such as the finite element of FIG. 2, according to an example embodiment of the present invention.

Progressive heating computations: At any point in time, particular heat bursts are computed by taking into account the actual path of the heat source, as exemplified in FIG. 3 for a laser scanning-based AM process. FIG. 3 depicts a cross-sectional view associated with a top surface intersection plane (e.g., $P_j$ from FIG. 2, viewed from above). An arbitrary number of heating events (characterized as a sequence of heat fluxes at given locations, shown as the circles 305 in FIG. 3) are computed per layer per element for accurate representation of the heating source in both time and space. In FIG. 3, paths 310 represent the paths that a laser takes according to the machine information. In the particular embodiment of FIG. 3, a heat flux is calculated based on the area covered by each pass of the laser over the triangular layer and on the laser's intensity. An arbitrary time incrementation sequence is allowed.

Figure 4:
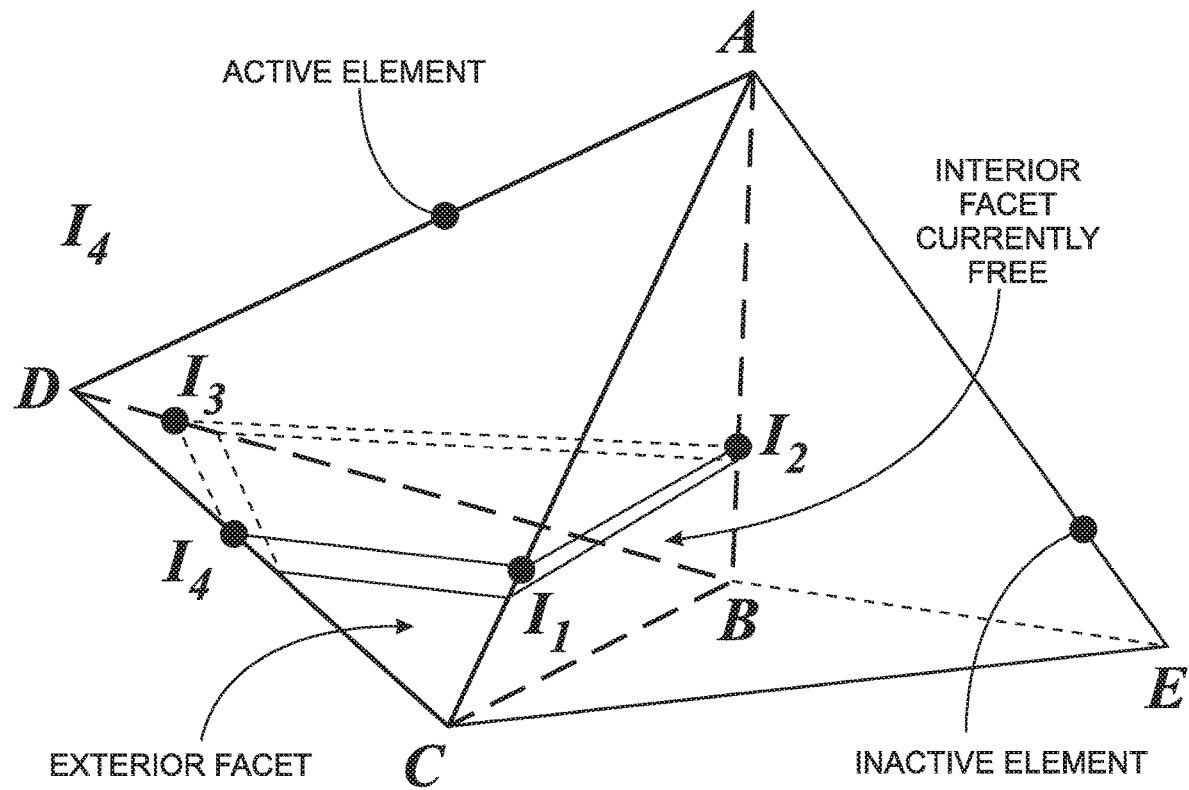
FIG. 4 is a schematic diagram illustrating two example adjacent finite elements, a layer added to one of the finite elements, and partial surface areas of the finite element, according to an example embodiment of the present invention.

Progressive cooling via convection and radiation: The partial facet area integration discussed above allows for a very precise assessment of cooling-related heat fluxes on any given finite element discretization. As depicted in FIG. 4, the location and surface area of the polygon $I_1,I_2,I_3,I_4$ and of the side polygon $B,I_2,I_1,C$ is be computed at any point in time to account very precisely for the area of the part being fabricated that is currently exposed to the exterior. Radiation and convection cooling can then be modeled well on accurately computed areas.

Embodiments of the present invention provide a highly scalable solution for part-level simulations of additive manufacturing processes of many kinds. This includes, but is not limited to, SLM, DLM, Polyjet, inkjet, and FDM technologies. Some particular advantages include:

(1) Allowing for independent and arbitrary meshing. Complex parts can be meshed as usual using the preferred Finite Element (FE) meshers without having to partition complex geometries using layer (or any other) information associated with the machine. For very complex parts, this approach allows for a much better approximation of the shape of the part being fabricated without the need of developing specialized meshing technology or resorting to voxel-based approaches, which suffer from inherent artificial stress concentrators.

(2) Accounting for real tooling path and real printing time (laser, electron beams, deposition heads, recoater bars, etc.) as if these paths were to be used in real machines. This includes tool paths with thousands of layers, millions of segments following complex geometries of real production parts. Users do not have to experiment with approximations of the machine information.

(3) Scalability to mitigate between computational performance and accuracy. One can simply use a very fine mesh for very accurate reference solutions (usually for small parts) or can use a coarser mesh for computationally efficient solution (usually for larger parts). A whole spectrum of FE meshes can be used. Applicable for both implicit and explicit time integration schemes to benefit from inherent advantages of each technology such as time step size, transient behavior, numerical convergence, and computational performance.

(4) For a given FE mesh, the "intersection" technology produces the best possible result for volume-based integration of any quantity (a quintessential operation in any FE software) as the volumes of different materials (raw state, such as powder, molten liquid state and solid state) are accounted for precisely. The solution can be used in conjunction with additional automated mesh refinement techniques, if needed.

(5) Localized heating effects are captured very well. The location of such heat events, their intensities, and their durations are captured very precisely without being directly dependent on the mesh choice due to the "intersection" computations of the heat source (such as a fast traveling laser spot) with the mesh.

(6) Convection and radiation heat loses are assessed on precisely computed surface areas, which, for any given mesh choice, would be precise as it can possibly get. By computing precisely the top surface on which most of the cooling occurs and by maintaining lists of active/inactive neighbor elements together with the partial facets computation as described above, the accuracy of the surface area over which cooling occurs far exceeds the mesh discretization choice.

Figure 5:
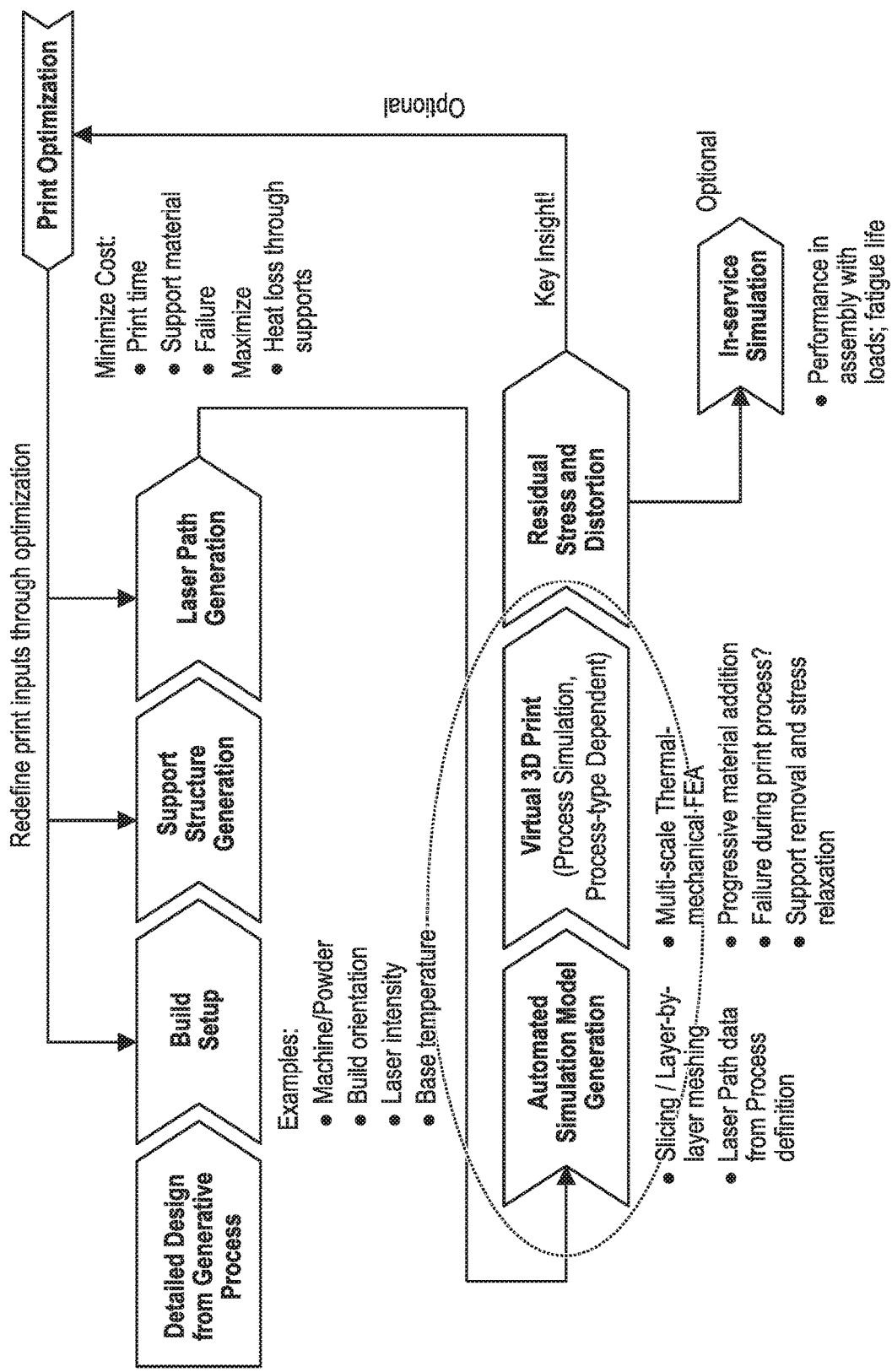
FIG. 5 is a block diagram illustrating an example overall additive manufacturing workflow.

An overall additive manufacturing workflow includes a larger number of building blocks, as depicted in FIG. 5. Within this context, the aspects described herein are associated with the two building blocks circled in FIG. 5. In more detail, the two circled blocks may follow the flow chart 600 shown in FIG. 6. The chart includes architectural details and is based on a Lagrangian FE code for time transient heat transfer solution. The time marching sequence follows the typical incrementation sequence usually encountered in time-transient solutions.

The flow chart 600 of FIG. 6 includes four major building blocks to carry out its functionality, as follows:

(1) Once per analysis functionality 605, which sets up efficient data structures associated with "intersecting" the machine information and the finite element mesh.

(2) Data associated with the geometric intersections between the machine data and the FE mesh is stored in a database, which may be part of the Intersection Module 610. A number of application programming interfaces (APIs) may be provided to trigger storage of data, actual computations, such as powder bed intersections top surface with the FE mesh, and laser heating bursts as described above.

(3) A time incrementation loop spanning the time required to print the part is depicted in 610, 615, 620, and 625. These are computations that are triggered once per increment no matter how many iterations the usual Newton-Raphson loop associated with nonlinear FE modeling in implicit time integration solutions might take. Computations of the actual intersections between the machine data and the FE mesh happen here and may use either the original configuration of the mesh or (in the case of coupled heat transfer-stress analyses) the current deformed configuration. Necessary data is stored, computed, and ultimately extracted as needed from the database.

(4) Lastly, there are a number of computations during iterations as usual in a FE code to apply external heat fluxes (both heating and cooling, as detailed above) by retrieving necessary pieces of information from the specialized database. These computations are depicted in 610 and 630.

Some example data structures for implementing the above components can include a finite element data structure, which stores for a finite element of the object to be simulated, (1) node numbers associated with the element, (2) nodal coordinates in 3D for the element, (3) and nodal displacements (used to compute deformed configurations of the element). Such data structures can be used to represent, in memory, a collection of elements of the part to be fabricated. Such data structures can also be used to represent, in memory, a collection of elements of the supports to be used to anchor the part during a printing process.

Example data structures for implementing the above components can also include machine processing information, which stores data representing raw material arrival information and data representing moving heat source information (e.g., lasers, UV lamps, etc.). The data representing raw material arrival can include, for example, (1) geometry of the raw material deposition entity (e.g., nozzle, spreader bar, ink jet printing banks, etc.), (2) time and location coordinates when a material depositing entity starts depositing material, and (3) time and location coordinates when a material depositing entity stops depositing material. The data representing a moving heat source can include, for example, (1) geometry of the heat source, (2) time and location coordinates when the heat source is turned on, and (3) time and location coordinates when the heat source is turned off.

Using the above example data structures, the intersection module, according to an example embodiment of the invention, can, at each increment of the simulation, compute and store intersections between the machine processing information and the finite elements. Such intersection can be computed by, (1) for each finite element, computing intersections between the material deposition trail and the finite element, (2) storing coordinates of the intersections of the trail with the edges of the finite elements, (3) computing the centers of mass of the added raw material in the corresponding finite elements for the increment, (4) for each finite element, computing intersections between the trail of each moving heat source with the edges of the finite elements, and (5) storing the duration of the time spent by each moving heat source in the corresponding elements and the locations of the centers of the areas covered by the heat source in the corresponding elements.

Figure 6:
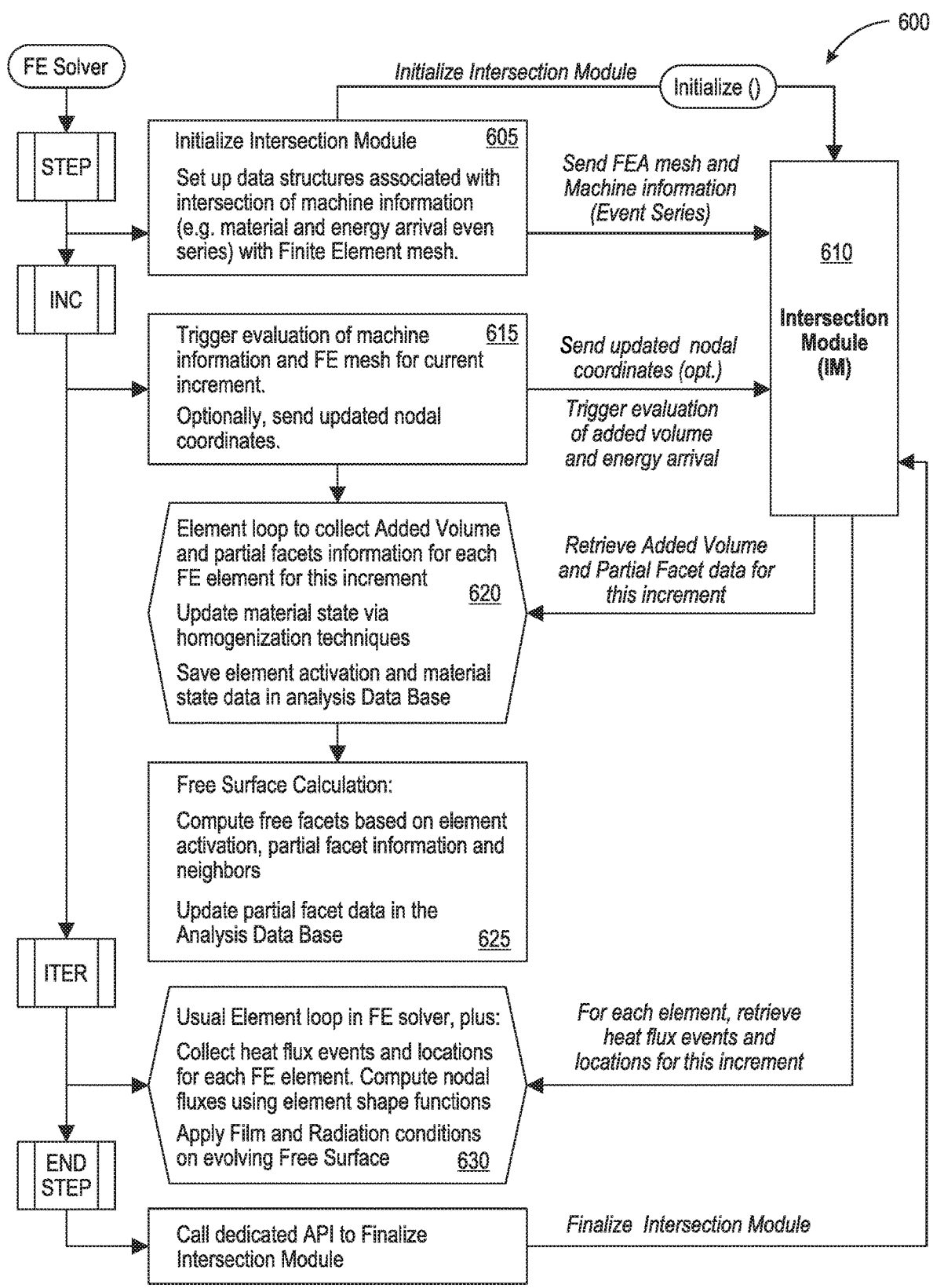
FIG. 6 is a flow diagram illustrating simulating of an additive manufacturing process, according to an example embodiment of the present invention.

Although the chart 600 of FIG. 6 is associated with an implicit time integration solution for a heat transfer solution, a very similar workflow can be associated with an explicit time integration heat transfer solution.

Computational performance: although it is natural to assume that a typical workflow would use an implicit time integration scheme because of the larger time increments that can be employed (fewer increments given the large physical time needed to be modeled), explicit integration solutions offer the inherent advantage of being able to capture faster transients in the action zone. When combined with the fact that explicit time integration FE codes normally scale better than implicit time integration counterparts on a large number of cores, an explicit time integration solution becomes very attractive. Benchmark exercises on real parts have demonstrated this point. A similar workflow chart applies for structural analysis if part distortions and residual stresses are of interest.

The discussion above is centered on a sequential workflow: solve the heat transfer problem first followed by applying the compute temperature histories in a subsequent stress analysis. This is possible because, typically, temperature evolution strongly affects stresses (e.g., via thermal expansion and temperature-driven phase transformations), but mechanical stresses and strains largely do not affect the temperature evolution, though a concurrently coupled temperature-stress solution is readily available.

Digital Processing Environment

Figure 7:
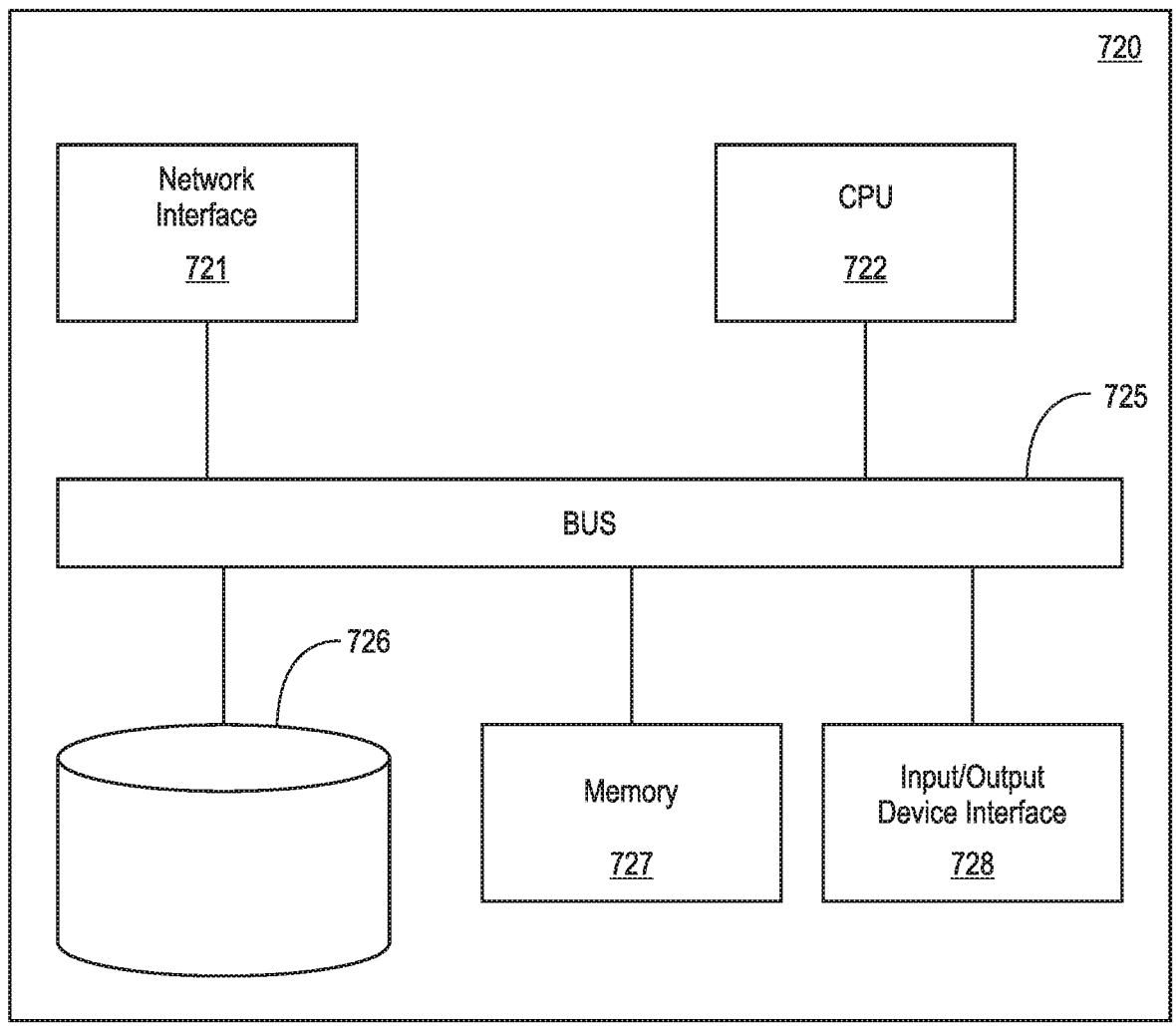
FIG. 7 is a block diagram of a computer (or digital processing) system for simulating an additive manufacturing process, according to an example embodiment of the present invention.

FIG. 7 is a simplified block diagram of a computer-based system 720 that may be used for simulating an additive manufacturing process according to an example embodiment of the present invention. The system 720 comprises a bus 725. The bus 725 serves as an interconnector between the various components of the system 720. Connected to the bus 725 is an input/output device interface 728 for connecting various input and output devices such as a keyboard, mouse, display, touch screen overlay, speakers, camera, sensor feeds, controllers, etc. to the system 720. A central processing unit (CPU) 722 is connected to the bus 725 and provides for the execution of computer instructions. Memory 727 provides volatile storage for data used for carrying out computer instructions. Storage 726 provides non-volatile storage for software instructions, such as an operating system (not shown). In particular, memory 727 and/or storage 726 are configured with program instructions implementing methods and/or modules 600, 605, 610, 615, 620, 625, and 630 for simulating an additive manufacturing process, as detailed in association with FIG. 6, for example. The system 720 also comprises a network interface 721 for connecting to any variety of networks known in the art, including cloud, wide area networks (WANs) and local area networks (LANs).

It should be understood that the example embodiments described herein may be implemented in many different ways. In some instances, the various methods, systems, and devices described herein may each be implemented by a physical, virtual, or hybrid general purpose computer. The computer system 720 may be transformed into the machines that execute the methods described herein, for example, by loading software instructions into either memory 727 or non-volatile storage 726 for execution by the CPU 722.

Figure 8:
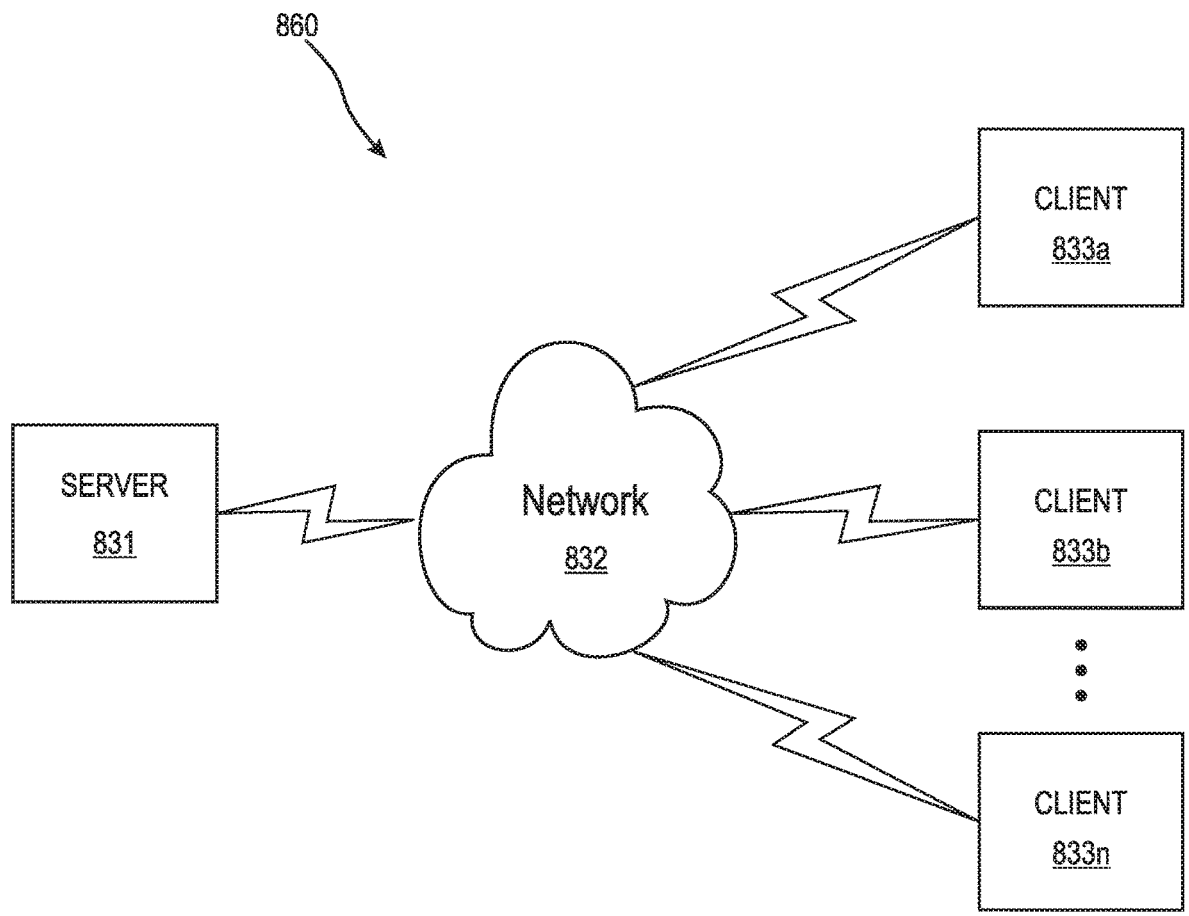
FIG. 8 is a schematic diagram of an example computer network environment in which embodiments of the present invention may be implemented.

FIG. 8 illustrates a computer network environment 860 in which an embodiment of the present invention may be implemented. In the computer network environment 860, the server 831 is linked through a communications network 832 to clients 833a-n. The environment 860 may be used to allow the clients 833a-n, alone or in combination with server 831 to execute any of the modules and/or methods described hereinabove (e.g., the methods and/or modules 600, 605, 610, 615, 620, 625, and 630 as detailed in association with FIG. 6, for example). It should be understood that the example embodiments described above may be implemented in many different ways. In some instances, the various methods and machines described herein may each be implemented by a physical, virtual, or hybrid general purpose computer, or a computer network environment such as the computer environment 860.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of simulating additive manufacturing of a real-world object, the method comprising:
    discretizing, by a processor in communication with memory, a representation of the real-world object into a plurality of finite elements using arbitrary meshes of arbitrary densities, the finite elements being representations of geometrical portions of the real-world object;
    storing the finite elements in the memory;
    determining, by the processor, a real-world additive manufacturing sequence as a function of time to be used by a real-world additive manufacturing device to manufacture the real-world object, the additive manufacturing sequence including a plurality of time steps and indicating an order in which to manufacture the portions of the real-world object represented by the finite elements; and
    for each time step of the additive manufacturing sequence:
        simulating, by the processor, manufacturing an arbitrary geometric layer of a finite element of the finite elements according to the additive manufacturing sequence;
        determining, by the processor, a sequence of simulated heat fluxes at corresponding locations of the layer according to the additive manufacturing sequence, the simulated heat fluxes accounting for a path and intensity of a heat source of a simulated additive manufacturing device within the layer when simulating the manufacturing of the layer;
        storing, in the memory, in association with the finite element corresponding to the layer, representations of the simulated heat fluxes; and
        for each finite element having a simulated manufactured layer:
            determining, by the processor, a current exposed partial surface area of the finite element;
            analyzing, by the processor, a path of simulated additive manufacturing tooling with respect to the layer according to the additive manufacturing sequence;
            simulating, by the processor, cooling of the finite element based on the current exposed partial surface area of the finite element; and
            updating, in the memory, the representations of the simulated heat fluxes associated with the finite element based on the simulated cooling of the finite element.

2. A method as in claim 1 wherein determining the current exposed partial surface area of the finite element includes determining, by the processor, the surface facets of the finite element that are not located adjacent to another active finite element surface facet based on the finite elements stored in the memory.

3. A method as in claim 1 wherein determining the sequence of simulated heat fluxes includes, for a given simulated heat flux, determining, by the processor, an intensity and duration of the heat source at a portion of the corresponding layer.

4. A method as in claim 1 wherein updating the representations of the simulated heat fluxes associated with the finite element includes determining, by the processor, and storing, in the memory, a partial volume of the finite element and partial facets areas of the finite element.

5. A method as in claim 4 wherein updating the representations of the heat fluxes of the finite element includes determining, by the processor, a state of a simulated substrate used to manufacture the finite element based on the simulated cooling of the finite element, the determined partial volume of the finite element, and the partial facets areas of the finite element.

6. A method as in claim 4 further including for each finite element, storing, in the memory, a list of neighboring finite elements and the partial volumes and partial facets areas of the neighboring finite elements.

7. A method of simulating additive manufacturing of a real-world object, the method comprising:
    obtaining, by a processor in communication with a memory storing, as representations, a plurality of finite elements of the real-world object, a real-world additive manufacturing sequence to be used by a real-world additive manufacturing device to manufacture the real-world object, the additive manufacturing sequence including a plurality of time steps; and
    for each time step of the additive manufacturing sequence:
        simulating, by the processor, manufacturing an arbitrary geometric layer of a finite element of the plurality of finite elements according to the additive manufacturing sequence;
        determining, by the processor, one or more simulated heat fluxes at corresponding locations of the layer according to the additive manufacturing sequence, the simulated heat fluxes accounting for a path and intensity of a heat source of a simulated additive manufacturing device within the layer when simulating the manufacturing of the layer;
        storing, in the memory, in association with the finite element corresponding to the layer, representations of the simulated heat fluxes; and
        for each finite element having a simulated manufactured layer:
            determining, by the processor, a current exposed partial surface area of the finite element;
            analyzing, by the processor, a path of simulated additive manufacturing tooling with respect to the layer according to the additive manufacturing sequence;
            simulating, by the processor, cooling of the finite element based on the current exposed partial surface area of the finite element; and updating, in the memory, the representations of the heat fluxes of the finite element based on the simulated cooling of the finite element.

8. A method as in claim 7 wherein determining the current exposed partial surface area of the finite element includes determining, by the processor, the surface facets of the finite element that are not located adjacent to another active finite element surface facet based on the finite elements stored in the memory.

9. A method as in claim 7 wherein determining the simulated heat fluxes includes, for a given heat flux, determining, by the processor, an intensity and duration of the heat source at a portion of the corresponding layer.

10. A method as in claim 7 wherein updating the representations of the simulated heat fluxes associated with the finite element includes determining, by the processor, and storing, in the memory, a partial volume of the finite element and partial facet areas of the finite element.

11. A method as in claim 10 wherein updating the representations of the heat fluxes of the finite element includes determining, by the processor, a state of a simulated substrate used to manufacture the finite element based on the simulated cooling of the finite element, the determined partial volume of the finite element, and the partial facet areas of the finite element.

12. A method as in claim 10 further including for each finite element, storing, in the memory, a list of neighboring finite elements and the partial volumes and partial facet areas of the neighboring finite elements.

13. A system for simulating additive manufacturing of a real-world object, the system comprising:
a data store storing a plurality of finite elements of the real-world object, the finite elements being representations of geometrical portions of the real-world object according to arbitrary meshes of arbitrary densities;
a hardware processor in communication with the data store and configured to simulate a real-world additive manufacturing device manufacturing the real-world object according to an additive manufacturing sequence that includes a plurality of time steps; and
an intersection module in communication with the hardware processor and the data store and configured to, given a particular time step of the additive manufacturing sequence, (i) determine added volumes and partial facet areas for finite elements affected by the simulated additive manufacturing device at the particular time step of the additive manufacturing sequence, and (ii) determine heat flux events and locations for the finite elements based on an intensity and path of a simulated heat source of the simulated additive manufacturing device at the particular time step of the additive manufacturing sequence;

the hardware processor configured to, in simulating the real-world additive manufacturing device, for each time step of the additive manufacturing sequence:
provide the time step to the intersection module;
receive, from the intersection module, added volumes and partial facet areas for finite elements affected by the simulated additive manufacturing device at the particular time step of the additive manufacturing sequence;
for each finite element of the affected finite elements, update the finite element, stored in the data store, with the added volumes and partial facet areas for the finite element, and determine a current exposed partial surface area of the finite element based on the added volumes and partial facet areas for the finite element;
receive, from the intersection module, heat flux events and associated locations for the finite elements;
for each heat flux event of the received heat flux events, update nodal heat fluxes associated with a corresponding finite element, stored in the data store, based on the associated location;
determine cooling of each finite element based on the current exposed partial surface area of the finite element; and
update each nodal heat flux based on the determined cooling of the finite element corresponding to the nodal heat flux.

14. A system as in claim 13 wherein the data store further includes, for each finite element stored in the data store, a list of neighboring finite elements, and wherein the processor is configured to determine the current exposed partial surface area of a given finite element based on the list of neighboring finite elements for the given finite element.

15. A system as in claim 14 wherein the data store further includes, for each neighboring finite element in each list of neighboring finite elements, an indication whether the neighboring finite element is active, and wherein the processor is configured to determine the current exposed partial surface area of a given finite element based on the list of neighboring finite elements for the given finite element and the associated indications of whether each neighboring finite element is active.

16. A system as in claim 13 wherein the hardware processor is further configured to provide the intersection module with nodal coordinates of the simulated additive manufacturing device.

17. A system as in claim 13 wherein the hardware processor is further configured to determine and store, in the data store, states of simulated substrates used to manufacture the finite elements based on the simulated cooling of the finite elements and the heat flux events.

* * * * *